Jan. 28, 1941. H. D. STECHER 2,229,682
APPARATUS FOR SECURING HOSE AND COUPLINGS
Original Filed Dec. 23, 1935
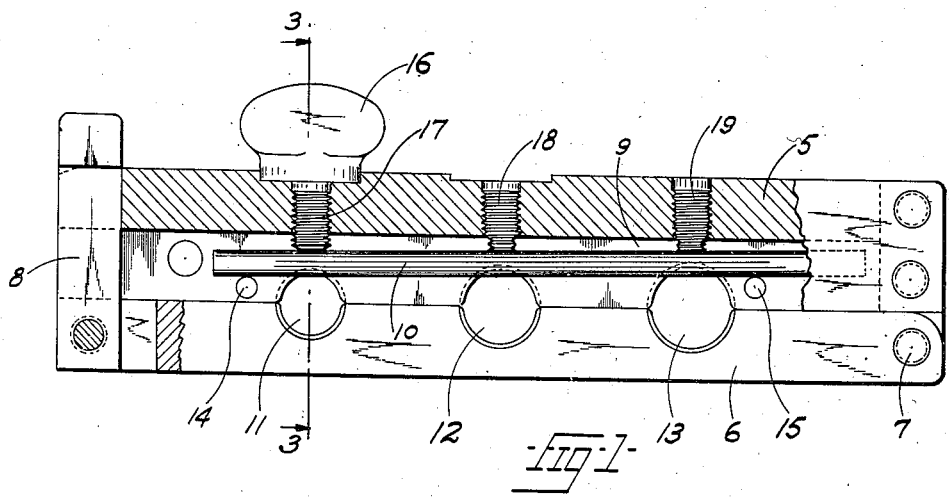
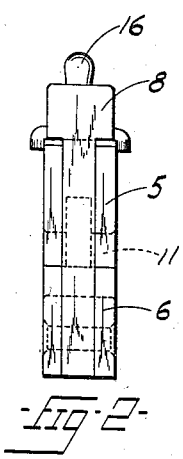
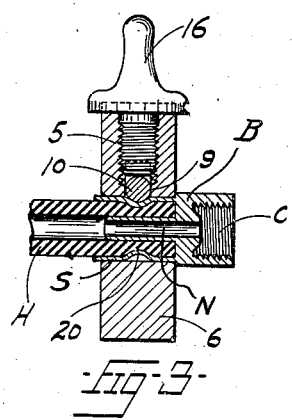
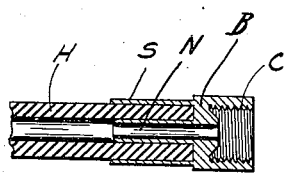
Inventor
HENRY D. STECHER.
By Richey & Watts
Attorney Patented Jan. 28, 1941

2,229,682

UNITED STATES PATENT OFFICE 2,229,682

APPARATUS FOR SECURING HOSE AND COUPLINGS

Henry D. Stecher, Lakewood, Ohio, assignor to The Weatherhead Company, Cleveland, Ohio, a corporation of Ohio Application December 23, 1935, Serial No. 55,700
Rerewed September 19, 1939

2 Claims. (Cl. 29—88.2)

This invention relates to coupling tools and more particularly to a tool for connecting a non-metallic hose to a metallic coupling of the type disclosed in Patent No. 2,000,680 issued May 7, 1935, to Albert J. Weatherhead, Jr.

In connecting a hose to a coupling according to the above mentioned patent, radial pressure is applied to the outer wall of a sleeve permanently joined to the coupling to form an inwardly extending groove therein, thus forming an inwardly projecting rib with the sleeve, which engages the hose and holds it securely against the nipple of the coupling. Ordinarily hoses and couplings of this type are assembled at the factory by rolling or spinning machines. Where hoses and couplings are to be assembled away from the factory, however, considerable difficulty has been encountered, for no convenient and efficient hand tools for this purpose have been available heretofore. It has been necessary to exercise great care to avoid the application of pressure in such a manner as to flatten or press the coupling out of round, or to deform the rib too far inwardly which would result in partially severing the hose within the coupling.

It is among the objects of my invention to provide a method for permanently securing a coupling to a hose which can be carried out rapidly and expeditiously with a minimum of skill being required on the part of the operator. Another object is to provide a simple and effective tool for carrying out my method. Another object is to provide a method of securing a coupling having a sleeve to a hose end wherein the circular cross section of the sleeve is maintained and distortion of the sleeve prevented. Another object of my invention is to provide a tool for securing a hose to a coupling which will produce in the coupling member a groove of the proper depth without skill being required on the part of the operator. Another object is to provide a coupling tool which can be employed in conjunction with couplings and hoses of different diameters.

Further objects and advantages of my invention will become apparent from the following description of a preferred form thereof, reference being made to the accompanying drawing wherein:

Figure 1 is a plan view partially in section of my coupling tool;

Fig. 2 is an end elevation of the tool illustrated in Fig. 1;

Fig. 3 is a sectional view as indicated by the line 3—3 on Fig. 1 illustrating the operation of the tool on a coupling member; and Fig. 4 is a sectional view illustrating a coupling member assembled with a hose but not secured thereto.

As illustrated in the drawing, my tool is particularly adapted for use with couplings of the type described in the Weatherhead patent referred to above which comprise a body portion B, a sleeve S and a nipple N, the sleeve and nipple together forming an annular chamber adapted to receive the end of the hose H. According to my method the hose is secured to the coupling by forming an inwardly extending groove in the sleeve which functions to compress the material of the hose against the nipple, thus securely and permanently joining the hose and coupling together. In forming the groove, difficulty has heretofore been encountered particularly when the couplings are made of soft metal such as aluminum in that the pressure necessary to form the groove in the sleeve is sometimes great enough to distort the end portion of the sleeve out of its original circular section, which sometimes results in cracking the sleeve or in the production of an assembly wherein the coupling sleeve is oval or elliptical rather than circular. To overcome this difficulty, I carry out my method in such a manner as to support the sleeve, preferably throughout substantially its entire circumference, and prevent such distortion from taking place. Also my tool is provided with means for automatically controlling the depth of the groove, thereby insuring a groove of sufficient depth to properly secure the hose to the coupling while at the same time preventing formation of the groove to a depth which might result in seriously weakening the material of the flexible hose.

The tool for carrying out my method preferably comprises interconnected complementary upper and lower die parts 5 and 6 pivoted to each other at one end through the pin 7 and releasably held in engagement by the pivoted latch 8 at the opposite end. In their latched position the two die parts cooperate to provide a series of spaced transverse bores 11—12—13 proportioned to receive therein the sleeves of couplings of different sizes. The apparatus to effect the application of radial pressure and thus produce a groove in the sleeve is carried by the upper die part 5, wherein a recess 9 is formed longitudinally of the tool to receive a longitudinally disposed rod 10. A pair of transverse pins 14 and 15 are arranged below the rod 10 to hold the rod within the recess 9.

To force the rod into engagement with a coupling sleeve and progressively increase the radially applied pressure a thumb screw 16 is positioned in the upper half of the die which may be selectively inserted in threaded apertures 17, 18 and 19 adjacent the sleeve receiving bores 11, 12 and 13 respectively. The end of the adjusting screw 16 engages the longitudinal rod 10 which in turn engages the sleeve within the die as shown in Fig. 3 to form the inwardly extending groove 20 therein. The extent of movement of the screw into the recess 9 is controlled by the engagement of the under side of the screw head with the upper die 5, and to limit the screw movement to the correct distance for the different sleeve diameters, the upper face of the die part 6 is countersunk or recessed adjacent the threaded bores 17 and 18, the recess adjacent bore 17 being deeper than the recess adjacent bore 18, while no recess is necessary adjacent bore 19.

In operation the die parts 5 and 6 may be latched as shown in Fig. 1 and the screw 16 withdrawn to permit the insertion of the sleeve S of the coupling into the bore as shown in Fig. 3 with the body portion engaging the tool as at 22, to insure the formation of the groove in the proper position longitudinally of the sleeve. The hose H is slipped into the sleeve and the screw 16 progressively advanced into engagement with the pin 10 while the entire tool is rotated with respect to the coupling to form the annular groove 20 in the sleeve. When the underside of the screw head engages the die part 5 the groove 20 will be formed to the correct depth to effectively grip the hose and form a secure connection between the hose and coupling without weakening the material of the hose. It will be noted that during the operation of forming the groove the portions of the die openings on the other side of the rod 10 from the body portion of the coupling function to support the end portion of the sleeve S and thus the circular cross section of the sleeve is maintained without material distortion during the operation of forming the groove.

It will thus be evident that by my method couplings and hoses can be securely joined together in such a manner as to produce a strong and leak proof joint. My tool for carrying out my preferred method is of simple construction, can be economically manufactured, and can be operated successfully without requiring any particular skill on the part of the operator.

Although a preferred form of my invention has been described in considerable detail in the foregoing specification, it is to be understood that modifications and changes may be made therein without departing from the spirit and scope of my invention as defined in the following claims.

I claim:

1. A coupling tool comprising a pair of bars having complementary parts cooperating to form an opening adapted to receive and closely engage the sleeve of a hose coupling, one of said bars having a longitudinally extending recess therein, means disposed in said recess and movable into engagement with a coupling sleeve disposed in said opening and adapted to form an inwardly extending groove therein in a zone intermediate the ends thereof upon relative rotation between said tool and said sleeve, the walls of said opening being adapted to support said sleeve and maintain the circular shape thereof as the groove is being formed.

2. A portable coupling tool for securing a conduit to a coupling comprising a pair of bars having separable complementary parts shaped at their abutting edges to provide an opening substantially circular in cross section which is adapted to receive and closely engage the sleeve of a hose coupling, one of said bars having a recess therein communicating with said opening, a rod mounted in said recess to be movable into engagement with a coupling sleeve disposed in the opening and form an inwardly extending annular groove in a zone intermediate the ends of the coupling upon relative rotation between the tool and said sleeve, the walls of said opening being adapted to contact the sleeve periphery to support the sleeve and maintain the circular shape thereof during the formation of said groove.

HENRY D. STECHER.